United States Patent [19]

Engwall

[11] Patent Number: 4,545,625
[45] Date of Patent: Oct. 8, 1985

[54] PRESTRESSED CYLINDRICAL SQUEEZE BEARING MEMBER

[75] Inventor: Mats A. Engwall, Hollister, Calif.

[73] Assignee: International Business Machines Corporation, Armonk, N.Y.

[21] Appl. No.: 470,661

[22] Filed: Feb. 28, 1983

[51] Int. Cl.[4] .................. F16C 32/04; F16C 32/06
[52] U.S. Cl. ................... 308/5 R; 308/1 A; 310/369; 384/100; 384/114
[58] Field of Search ...... 308/1 R, 3 R, 5 R, DIG. 14; 384/114, 278, 100; 84/DIG. 24; 310/369, 328

[56] References Cited

U.S. PATENT DOCUMENTS

| | | | |
|---|---|---|---|
| 1,860,529 | 5/1932 | Cady | 310/321 |
| 2,970,019 | 1/1961 | Brown et al. | 384/278 |
| 3,043,967 | 7/1962 | Clearwaters | 310/369 X |
| 3,084,003 | 4/1963 | Matt et al. | 384/278 |
| 3,114,848 | 12/1963 | Kritz | 310/322 |
| 3,239,283 | 3/1966 | Broeze et al. | 384/129 |
| 3,339,421 | 9/1967 | Warnock | 74/5 |
| 3,359,045 | 12/1967 | Hsu | 308/1 R |
| 3,360,665 | 12/1967 | Boswell | 310/328 |
| 3,433,538 | 3/1969 | Blanding et al. | 384/114 |
| 3,471,205 | 10/1969 | Farron et al. | 384/107 |
| 4,220,887 | 9/1980 | Kompanek | 310/369 X |

FOREIGN PATENT DOCUMENTS 0067317  5/1982  European Pat. Off. ............ 308/6 C

OTHER PUBLICATIONS

Shigley, *Mechanical Engineering Design*, pp. 200-206, McGraw-Hill 1977 3rd edition.
Salbu, "Compressible Squeeze Films and Squeeze Bearings," International Business Machines Corp., *Transaction of the ASME Journal of Basic Engineering*, Jun. 6, 1964.

*Primary Examiner*—Stuart S. Levy
*Assistant Examiner*—Joseph J. Hail, III
*Attorney, Agent, or Firm*—Richard E. Cummins; Thomas R. Berthold

[57] ABSTRACT

A sleeve/rod type squeeze bearing system is disclosed in which the piezoceramic driving element is placed in compression to an extent that limits or eliminates stress reversals of the piezoceramic driving element during vibrating cycles. Eliminating or limiting stress reversals increases reliability of the bearing system and extends the useful life of the bearing elements. The bearing load of such a system may also be increased.

4 Claims, 7 Drawing Figures

PRESTRESSED CYLINDRICAL SQUEEZE BEARING MEMBER

DESCRIPTION

BACKGROUND OF THE INVENTION

1. Field of the Invention

This invention relates to bearings and, in particular, to cylindrical squeeze bearings where one vibrating bearing member is a bimorph element.

2. Description of the Prior Art

The general principles of operation of squeeze bearings are set forth in an article entitled "Compressible Squeeze Films and Squeeze Bearings" by E. O. Salbu in the June 1964 issue of the *Trans. ASME Journal of Basic Engineering*. Since that time, the art has suggested various configurations for bearing members along with improvements in the bearing materials and in construction of the bearing elements per se. Interest has developed in the use of tubular shaped squeeze bearing systems for magnetic disk files, particularly in the carriage mechanism which functions to guide the magnetic transducer of the disk file as it is moved between magnetic tracks on a rotating magnetic disk. See, for example, commonly assigned copending application Ser. No. 82/01828, filed Dec. 30, 1982 and also commonly assigned copending application Ser. No. 273,280, filed June 12, 1981.

The prior art has shown that considerable improvement in the bearing quality, i.e., the load carrying capacity and the bearing stiffness, is obtained when one of the tubular or cylindrical bearing elements is what is referred to as a bimorph element. Generally, a bimorph element comprises a cylinder of piezoceramic material, such as PZT-4, which is integral with a cylinder of bearing material such as Pyrex glass. The bimorph element functions as the energizing transducer for the squeeze bearing by causing the bearing surface to vibrate or oscillate relative to an adjacent bearing surface of the other bearing member element to produce the air pumping action necessary to establish the squeeze bearing system.

It is known that the piezoceramic material in the energizing transducer of the cylindrical bearing element is subject to mechanical failure due to fatigue of the material which is subjected to cyclic loading during normal operation. The high frequency stress reversals (tensile to compressive and back to tensile, etc.) are especially undesirable since they establishes a fairly low nominal allowable stress. The number of stress reversal cycles, which may reach 100 million cycles in less than an hour at ultrasonic frequencies, makes it necessary to use an endurance stress limit in the design calculation of squeeze bearing members. The maximum stresses encountered depend upon deflection of the squeeze bearing at the resonance frequency and the associated electric field strength (i.e., the applied voltage for a given geometry). Since mechanical failure is, in fact, the common failure mode, the endurance limit establishes an upper bound for deflections and applied voltage for the squeeze bearing, thus limiting obtainable load capacity and bearing stiffness.

It has been found that by limiting stress reversals and operating the piezoelectric material in compression at all times, the incidence of fatigue failure can be greatly reduced. By prestressing the piezoceramic material radially and circumferentially so that it is in compression, the cyclic tensile stresses, which are also radial and circumferential, are minimized, if not automatically eliminated.

The present invention is directed to a cylindrical squeeze bearing system employing a bimorph transducer in which concern is greatly reduced for mechanical failure of the bearing as a result of fatigue of the piezoceramic material.

SUMMARY OF THE INVENTION

The present invention involves a squeeze bearing system in which one of the bearing elements which acts as the energizing transducer and includes the cylindrical piezoceramic material is provided with a prestressing cylinder to prevent radial and circumferential stress reversals in the piezoceramic material during operation.

In accordance with the present invention, it has also been found that in addition to the fatigue failure mechanism mentioned above, sporadic occurrences of surface cracks on a piece of piezoceramic material may permit brittle fracture at much lower tensile stress values than the endurance limit for which the bearing was designed. These little fractures may occur either immediately when the load is applied or after only a few stress cycles.

When compressive prestress of sufficient magnitude is applied in a direction essentially perpendicular to the crack, the crack propagation is either halted or terminated after a finite growth as a result of stress relaxation in the material. Therefore, prestressing of the piezoceramic material not only improves load capacity and performance of the squeeze bearing, but also enhances operating life and functional reliability. These factors are of paramount interest in connection with the use of such bearings in commercial products.

It is, therefore, an object of the present invention to provide an improved cylindrical squeeze bearing system.

A further object of the present invention is to provide a cylindrical squeeze bearing system which will not fail due to fatigue of the piezoceramic material resulting from high frequency stress reversals.

A further object of the present invention is to provide a cylindrical type squeeze bearing system which has been designed to attain a load capacity and stiffness that is not determined by an endurance limit based upon stress reversals of the piezoelectric material.

A still further object of the present invention is to eliminate radial and circumferential stress reversals in the piezoceramic material of a squeeze bearing element without limiting its ability to oscillate and provide the squeeze bearing function.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
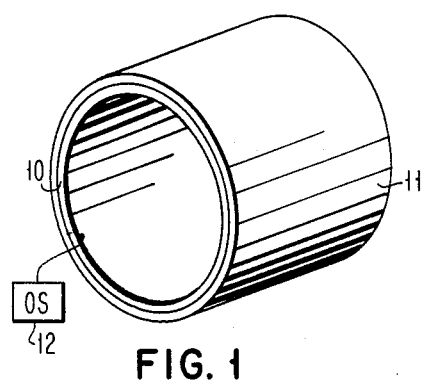
FIG. 1 is a perspective view illustrating the piezoceramic cylinder element and the prestress cylinder element employed with the bearing element of the present invention.
Figure 2:
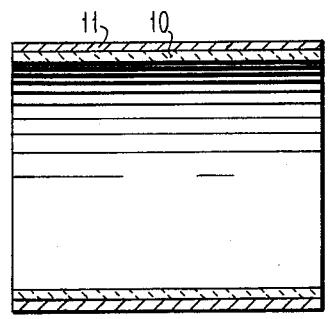
FIG. 2 is a longitudinal cross-sectional view of the cylindrical element shown in FIG. 1.

The squeeze bearing system shown in FIG. 1 comprises a piezoceramic cylindrical element 10 and a prestressed cylindrical element 11. The piezoceramic element 10 is made of any suitable piezoceramic material known in the art, such as PZT-4, which will oscillate or change shape in response to an applied high voltage signal from a suitable oscillating source designated by a block in FIG. 1 having reference character 12. The prestressed cylindrical element 11 may be a metal or metal alloy, such as molybdenum. Alternately, other material or composites such as carbon/graphite or glassfiber reinforced epoxies may be employed. Cylinders 10 and 11 may be assembled in any of the known methods to place cylinder 10 in radial and circumferential compression to an extent that when the high frequency signal is applied, cylinder 10 tends to stay in compression during the complete cycle of oscillation. The amount of radial and circumferential compression desired will determine the relationship of the inside diameter of the prestressing member 11 and the outside diameter of the piezoceramic cylinder 10. The amount by which the inside diameter is smaller than the outside diameter will determine the amount of prestresses applied and the choice of assembly methods. Shrink-fitting of the two cylinders is the preferred method of assembly where the prestressed cylinder is metal.

Figure 3:
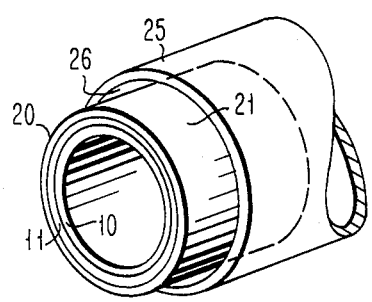
FIG. 3 is a perspective view of a squeeze bearing system in which one of the bearing elements includes the assembly shown in FIGS. 1 and 2.

Two types of bimorph cylindrical bearing elements may be constructed employing the prestressed cylindrical assembly of FIG. 1. The first type of bearing element is shown in FIG. 3 where the assembly of FIG. 1 is inserted into a cylindrical journal bearing element 20 and fixedly attached thereto to form the vibrating oscillating element of the squeeze bearing. The composite bearing element shown in FIG. 3 is inserted into a larger cylinder bearing element 25 so that the outer cylindrical surface 21 of bearing element 20 becomes the vibrating bearing element surface, while the inner surface 26 of bearing element 25 becomes the other bearing surface.

Figure 4:
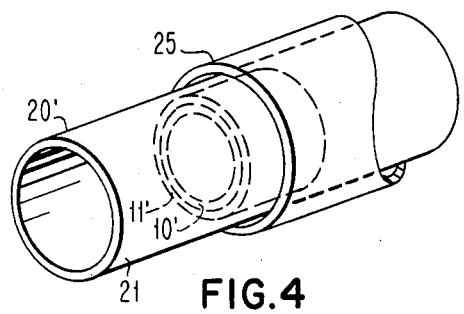
FIG. 4 is a perspective view of a squeeze bearing system similar to that shown in FIG. 3 in which the cylindrical bearing element is longer than the prestressed cylindrical elements.

FIG. 4 shows a bearing element that is similar to that shown in FIG. 3, except that the cylindrical bearing element 20' is extended axially in either direction of the prestressed cylindrical assembly.

In both the embodiments of the invention shown in FIGS. 3 and 4, the position of the prestressing cylinder in the composite structure does not affect the bimorph effect since the prestressing cylinder and the bearing element are located on the same side of the piezoceramic cylindrical element. Any change of shape of the piezoceramic cylindrical element 10' about the vertical or horizontal cross-sectional axes during one cycle of the applied signal will be transmitted directly to the cylindrical bearing element 20 through the prestressing cylinder 11' since it is affixed to both elements.

Figure 5:
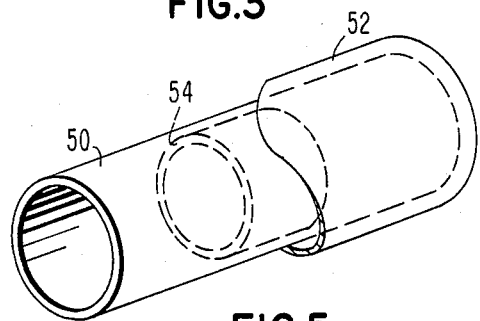
FIG. 5 is a perspective view of a squeeze bearing system in which one of the bearing elements functions as the prestressing cylinder for the piezoceramic cylinder.

FIG. 5 illustrates an embodiment of the invention which is similar to that shown in FIGS. 3 and 4. As shown in FIG. 5, the function of the prestressing cylinder element 11' and the cylindrical bearing element 20 are combined into one integral cylindrical element 50. As shown in FIG. 5, cylindrical element 50 acts as the inner-bearing element relative to bearing element 52 and also as a prestressing cylinder for the piezoceramic cylindrical element 54. The diameters of elements 50 and 54 are such that elements 54 is in radial and circumferential compression during substantially the entire vibrating cycle, or if a stress reversal does occur, the material is subject to only a minimal tensile stress. As a result, the piezoceramic material never undergoes a stress reversal during operation.

Figure 6:
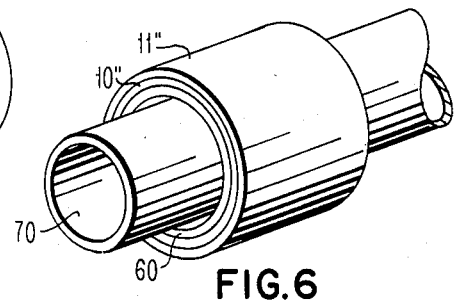
FIG. 6 is a perspective view of another type of squeeze bearing system in which the assembly of FIG. 1 is inserted over the other bearing element.
Figure 7:
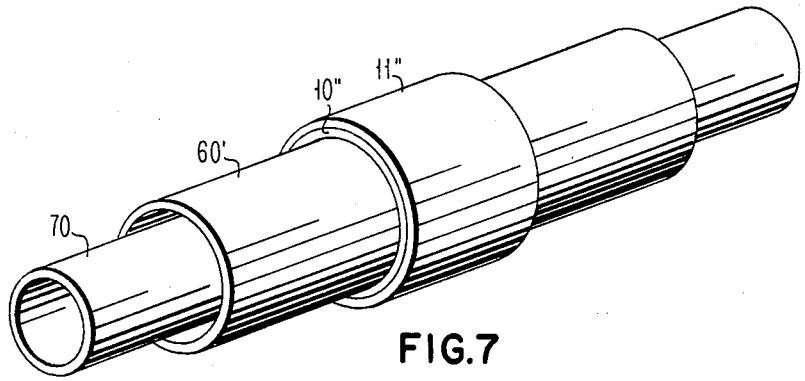
FIG. 7 is a perspective view of a bearing system similar to that shown in FIG. 6 in which the internal bearing element is substantially longer than the other bearing element which is prestressed.

The second general type of squeeze bearing system is shown in FIGS. 6 and 7. As shown in FIG. 6, the prestressed assembly of FIG. 1 is placed over the bearing element 60 so that the piezoceramic material 10" is disposed between the bearing element 60 and the prestressing cylinder element 11". Since the piezoceramic cylindrical member 10" is under radial compression, the bimorph effect of the composite structure is reduced in the assembly of FIG. 6.

The bearing system of FIG. 7 is similar to that of FIG. 6 except that the length of the cylindrical bearing element 60 is much longer than the prestressed bearing assembly.

In both embodiments, the second bearing element 70 is shown as a rod disposed in a nested relationship internally of the cylindrical prestressed bearing element.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new and desire to secure by Letters Patent is:

1. A cylindrical squeeze bearing system including first and second cylindrical bearing elements coaxially nested about a longitudinal axis, the first bearing element being the radially inner element including a hollow cylindrically shaped single-piece radially polarized piezoelectric element and another hollow cylindrically shaped single-piece element located radially outer of the piezoelectric element and in contact with the entire outer cylindrical surface of the piezoelectric element for placing said piezoelectric element in sufficient radial and circumferential compression to minimize tensile stress while said first and second bearing elements are functioning as a squeeze bearing system.

2. The cylindrical squeeze bearing system of claim 1 in which said first bearing element is a bimorph in which said piezoelectric element is integral with said first bearing element to cause vibration when said piezoelectric element is energized and said other cylindrical element of said first bearing element maintains said bimorph in compression during each cycle of vibration to prevent stress reversals in said piezoelectric element.

3. The cylindrical squeeze bearing system of claim 2 in which said other cylindrical element of said first bearing element has a radially outer cylindrical surface for providing a bearing surface for the squeeze bearing system.

4. The cylindrical squeeze bearing system set forth in claim 1 in which said piezoelectric element is made from a piezoceramic material.

* * * * *